United States Patent [19]

Yamamoto

[11] 4,237,495

[45] Dec. 2, 1980

[54] CIRCUIT FOR DOUBLING THE NUMBER OF OUTPUT BITS OF A PHOTODIODE ARRAY

[75] Inventor: Akimitsu Yamamoto, Ebina, Japan

[73] Assignee: Xerox Corporation, Stamford, Conn.

[21] Appl. No.: 20,887

[22] Filed: Mar. 15, 1979

[30] Foreign Application Priority Data

Mar. 22, 1978 [JP] Japan .................................. 53-32540

[51] Int. Cl.³ .......................... H04N 1/40; G06K 9/00
[52] U.S. Cl. ................................... 358/282; 358/283; 358/262; 340/146.3 AG
[58] Field of Search ............... 358/280, 282, 283, 262; 340/346.3 AG

[56] References Cited

PUBLICATIONS

T. E. Cassada and J. E. Garcia, Sep. 1973, "Facsimile Threshold with Background Control", IBM Technical Disclosure, vol. 16, No. 4.

M. L. Duff, "Gradient Detection System", IBM Technical Disclosure, vol. 18, No. 12, May 1976.

Primary Examiner—Robert L. Griffin
Assistant Examiner—Edward L. Coles
Attorney, Agent, or Firm—Robert E. Cunha

[57] ABSTRACT

A circuit for converting a series of photoelectric element array voltage outputs into twice the number of binary bits is described. Each photodiode output voltage is compared against two reference voltages to produce a two bit code word signifying a low, medium or high photodiode output. This is then operated on by a circuit implementation of a logic equation to produce a two bit serial output. The result is the frequency doubling of a photodiode array output for greater fidelity during transmission and reproduction of the original image.

5 Claims, 5 Drawing Figures

CIRCUIT FOR DOUBLING THE NUMBER OF OUTPUT BITS OF A PHOTODIODE ARRAY

BACKGROUND OF THE INVENTION

The invention relates to a light image reading method for reproducing and transmitting with higher fidelity the image signal read from an original document by the use of an array of photoelectric converting elements such as photodiodes.

In light image reading methods, such as original document reading methods used in facsimile equipment, an original document is scanned so that its light image is converted into a series of electric signals which in turn are compared with a predetermined level of voltage to be converted into binary signals. For example, a photodiode array having a number of photodiode elements arranged in the main scanning direction is used to scan the original document so as to provide a series of binary signals in accordance with the image information on the original document. In order to produce an accurate copy from the original document, it is conventional practice to provide double the number of photodiode elements in the scanning array as there are image units on a scanning line so that the photodiode arrangement period is one-half the minimum image period. However, this results in a very expensive method as the number of photoelectric converting elements is increased.

Therefore, the present invention has for its object to provide a light image reading method or an image signal converting method using a photodiode array comprising photodiode elements equal in number to the maximum number of image units on one scanning line of the original document so that the element arrangement period is equal to the maximum image frequency, and logically operating on the output image signal from the photodiode array to double the number of image units. The method of the present invention can relatively inexpensively provide improved image signal resolving power and halftone reproduction.

SUMMARY OF THE INVENTION

In accordance with the present invention, the output of each photodiode in the array is compared to two reference voltages so that the signals are separated into black, white and gray signals. Then a circuit is used to operate on these signals to produce two binary bits for each signal.

The logic equation may be described as follows. If the photodiode output is either above the higher reference voltage or below the lower reference voltage, the two produced bits will be 1's or 0's, respectively. If the photodiode output is between the referenced voltage levels, then the output bits will be a 1 and a 0 if the previous bit was a 1, or a 0 and a 1 if the previous bit was a 0. Thus, when a gray area in the original is scanned, the photodiode voltage output will be between the reference voltage levels, and alternate 1's and 0's will be produced.

The result of this method is the doubling of the output bit rate to enable the transmission and reproduction of an image with greater fidelity.

DETAILED DESCRIPTION OF THE INVENTION

Figure 1:
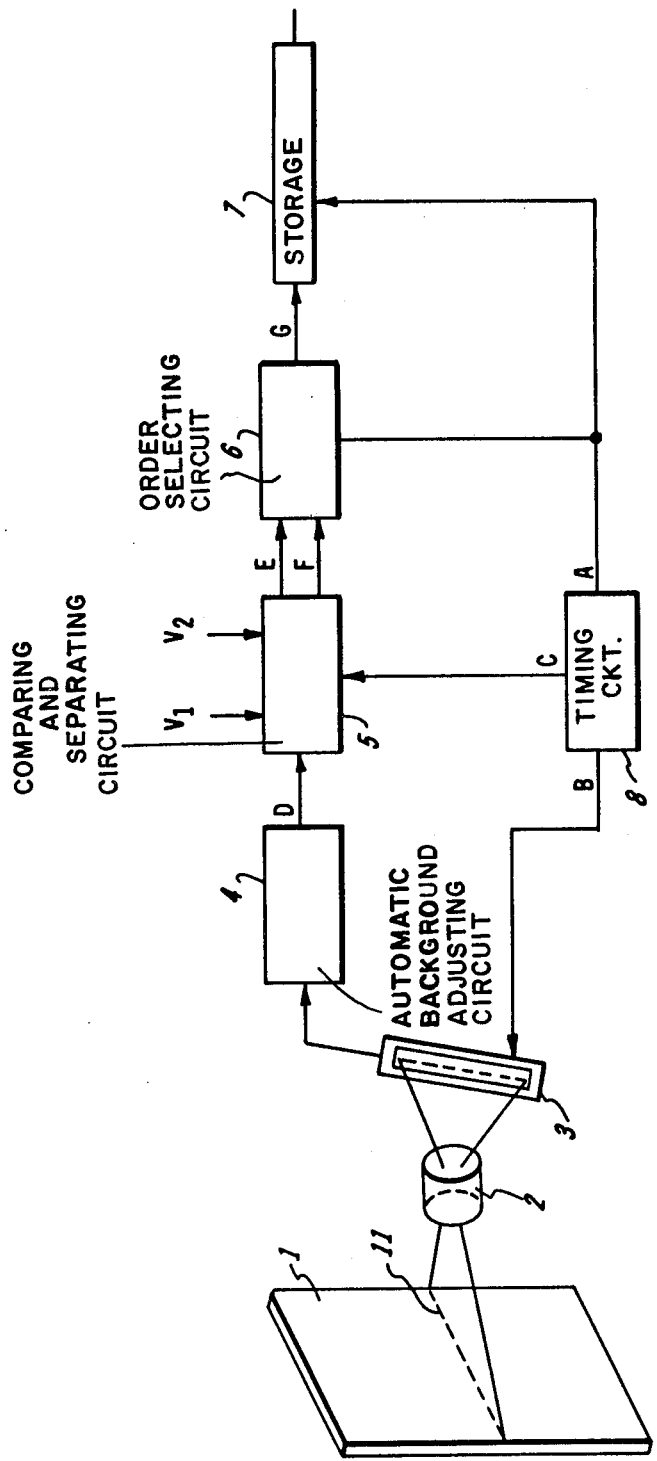
FIG. 1 is a block diagram showing one embodiment of the present invention.
Figure 4A:
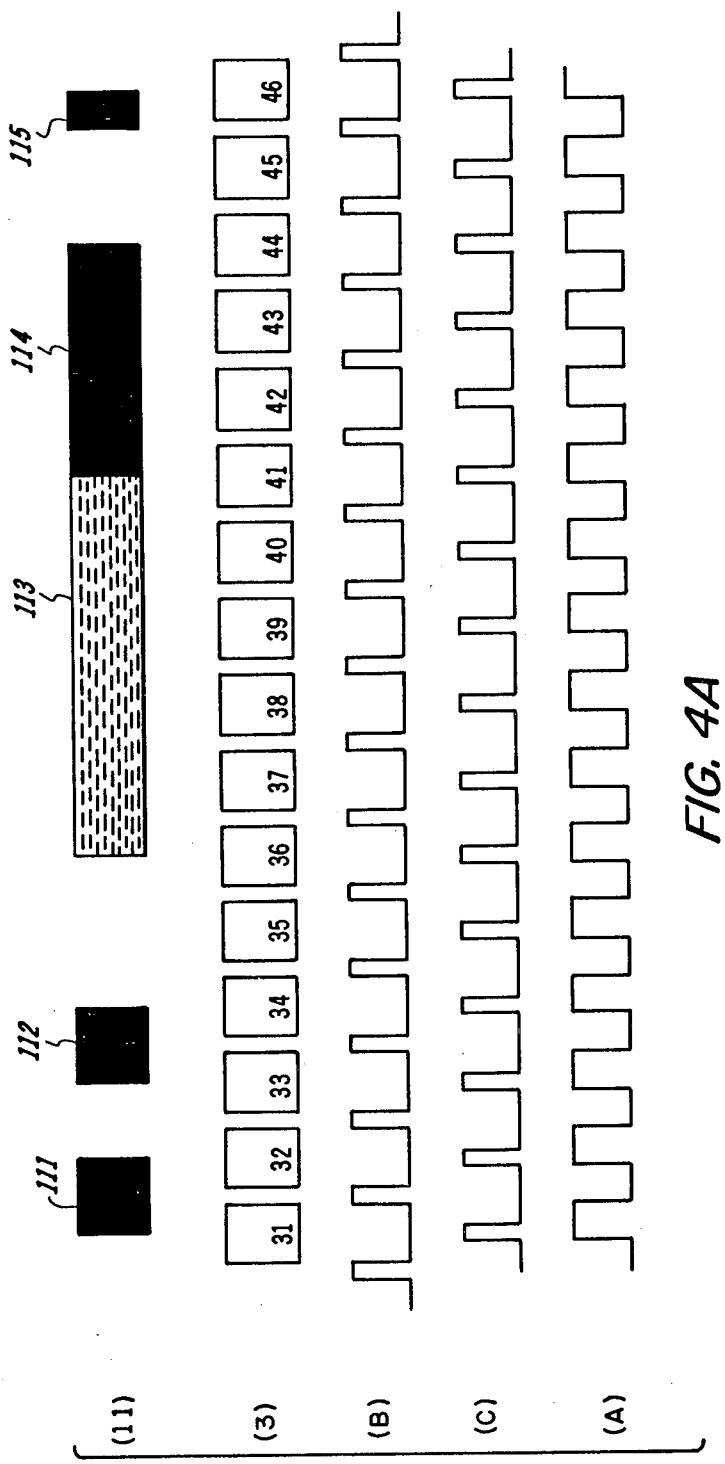
FIG. 4a-b are timing charts used to explain the operation of the present invention.
Figure 4B:
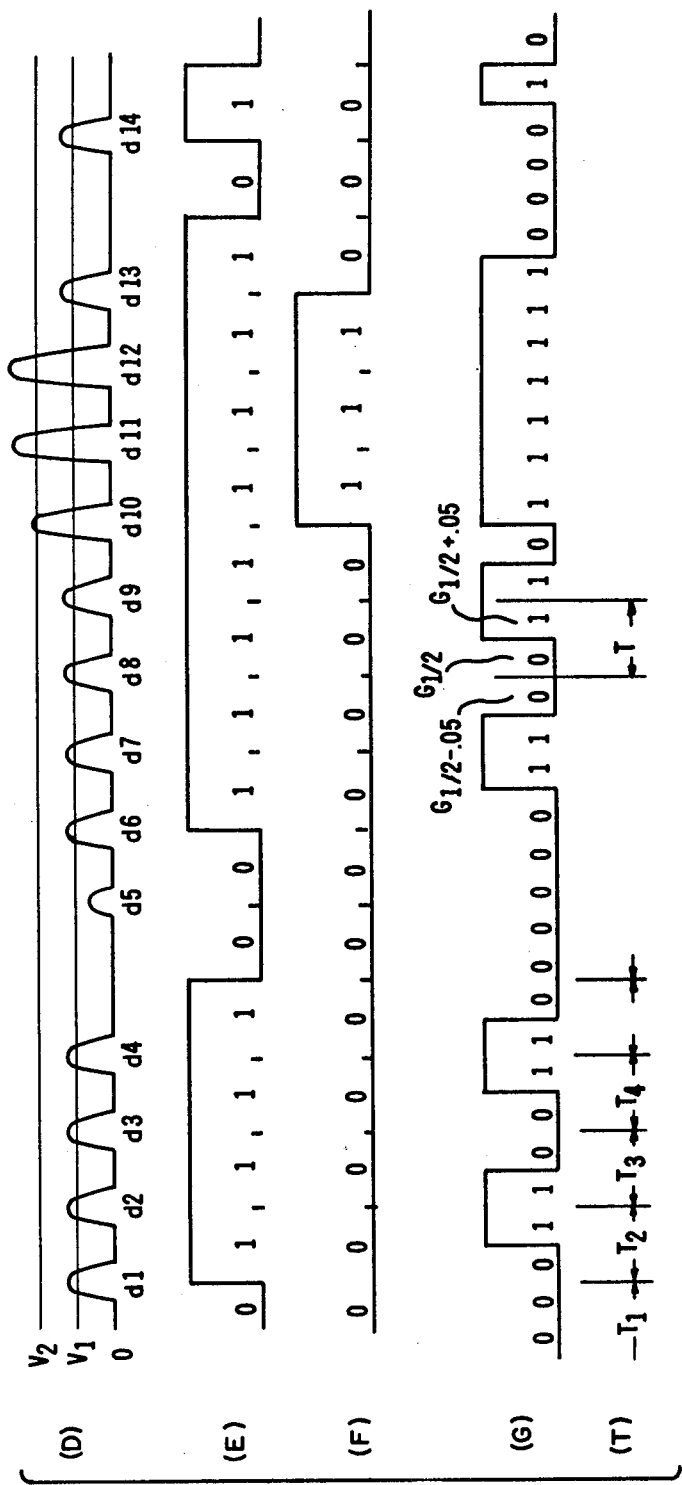

The present invention will now be described in detail with reference to the accompanying drawings, in which FIG. 1 is a block diagram showing one embodiment of the present invention and FIG. 4 is a timing chart used to explain the operation of the present invention. One line of image information 11 on an original document 1 is projected through an optical lens 2 on a photodiode array 3 where the image information is separated into image units through the respective photodiode elements of the photodiode array 3 and then converted to electric image signals. The electric image signals are converted to a series of electric signals in accordance with a photodiode array reading pulse B and in turn are fed to an automatic background adjusting circuit 4 where the density of the background of the original document is adjusted and an image signal D (see FIG. 4) is provided therefrom. The image signal D is applied in every time slot to a comparing and separating circuit 5 where the image signal D is compared with two reference voltages V1 and V2 (V1<V2) and separated into three ranges, the first range being above the voltage V2, the second range between the voltages V1 and V2, and the third below the voltage V1. They are held for a predetermined time in accordance with an image signal sampling pulse C. The reference voltages V1 and V2 may be desirably selected as long as V1<V2, and may be selected so as to be ⅓ and ⅔ of the expected maximum voltage of the image signal. The separated three range image signals are outputted in every time slot as binary signals E and F in such a fashion that E=F=0 with the image signal below the voltage V1, E=1 and F=0 with the image signal between the voltages V1 and V2, and E=F=1 with the image signal above the voltage V2. The binary signals E and F are simultaneously applied to an order selecting circuit 6 where the binary signals E and F are compared with the immediately previously outputted binary signal G/2−0.5, and logically operated on to produce two signals in series in the time slot. The logical conversion of the order selecting circuit 6 is effected in accordance with the following equations:

$$Gi/2 = Ei \cdot Fi + \overline{Gi/2 - 0.5} \cdot Ei \cdot \overline{Fi} \quad (1)$$

$$Gi/2 + 0.5 = Ei \cdot Fi + \overline{Gi/2 - 0.5} \cdot Ei \cdot \overline{Fi}$$

where Ei and Fi are the signals inputted in a time slot Ti having a predetermined time interval. Gi/2 and Gi/2+0.5 are the two signals G outputted in the first and second halves of the time slot Ti, and Gi/2−0.5 is the signal G outputted in the time slot immediately before the time slot Ti.

The following table is a conversion table of Equation (1).

| Ei | Fi | Gi/2 − 0.5 | Gi/2 | Gi/2 + 0.5 |
|----|----|-----------|------|-----------|
| 0  | 0  | 1         | 0    | 0         |
| 0  | 0  | 0         | 0    | 0         |

-continued

| Ei | Fi | Gi/2 − 0.5 | Gi/2 | Gi/2 + 0.5 |
|---|---|---|---|---|
| 1 | 1 | 1 | 1 | 1 |
| 1 | 1 | 0 | 1 | 1 |
| 1 | 0 | 1 | 1 | 0 |
| 1 | 0 | 0 | 0 | 1 |

The two signals G outputted in the first and second halves of the time slot by the conversion as described above are subsequently stored in a temporary storage element 7 which has double the number of storage elements as there are diode elements in the photoelectric converting array 3. Finally, the image is reproduced at a desired reading speed.

Figure 2:
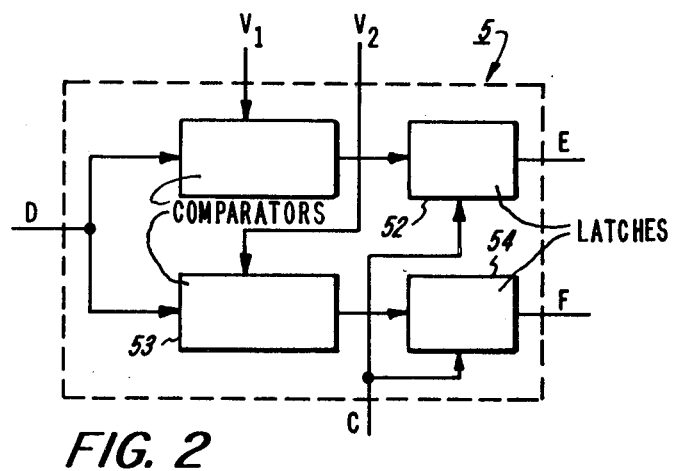
FIG. 2 is a block diagram showing an example of a comparing and separating circuit forming a part of the present invention.

FIG. 2 illustrates an example of the comparing and separating circuit 5 for carrying out the method of the present invention. The input image signal D is applied to comparator circuits 51 and 53. The comparator circuit 51 compares the image input signal D with the reference voltage V1 and provides a 1 output for a higher input and a 0 output for a lower input. The resulting output signal is applied to a latch circuit 52 where the output signal of the comparator circuit 51 is held for a predetermined time in accordance with the image signal sampling pulse C timed to compensate for the delay of the signal from the photoelectric converting array 3. Signal E is the latch 52 output. The comparator circuit 53 compares the output signal D with the reference voltage V2 to provide a 1 signal for a higher input and a 0 output for a lower input. The resulting output signal is then applied to a latch circuit 54 to provide a signal F.

Figure 3:
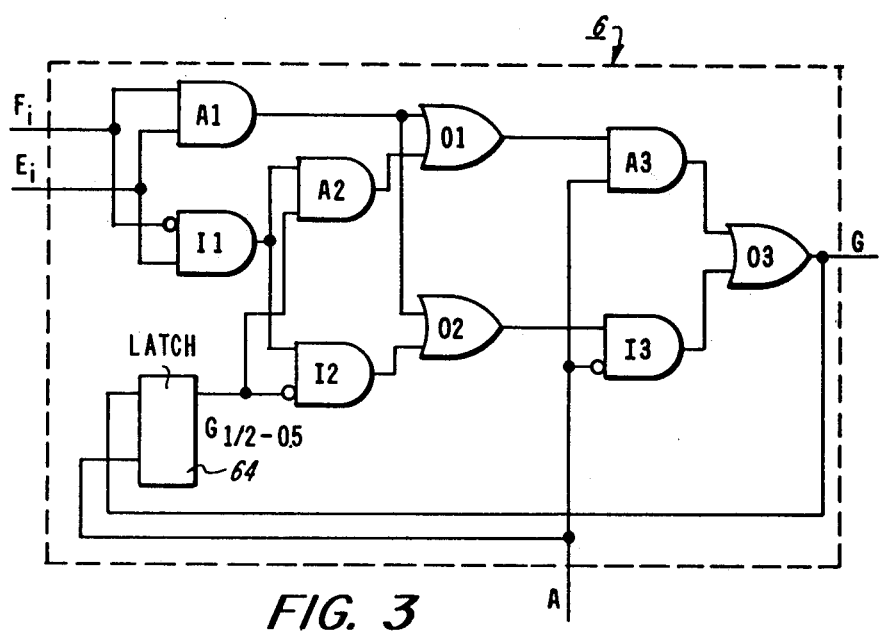
FIG. 3 a schematic diagram showing an order selecting circuit.

FIG. 3 is a schematic of circuit 6 of FIG. 1 comprising a latch circuit 64 for temporarily storing the output signal Gi/2−0.5 from the time slot immediately before the time slot Ti, AND circuits A1 to A3, inhibit circuits 11 to 13, and OR circuits O1 to O3. This circuit performs the logical operation as expressed by Equations (1) to provide two signals, Gi/2 and Gi/2+0.5, in the respective first and second halves of the time slot Ti. The sampling pulse A is equal in period to the image signal sampling pulse C and has a 50% duty cycle.

The operation of the present invention will now be described with reference to the timing chart of FIG. 4. In the case where one line of image information 11 on the original document 1 has black portions 111, 112, 114 and 115 and a gray portion 113 and is projected on the photodiode elements 31 to 46 of array 3, a black portion 111 is read by the photodiode elements 31 and 32 and the black portion 112 is read by the photodiode elements 33 and 34 in accordance with the reading timing pulse B, whereby a series of signals d1 to d4 are outputted. Since the respective images having black and white portions are projected on the photodiode elements 31 to 34, the levels of the output signals d1 to d4 are between the reference voltages V1 and V2. These signals are sampled in accordance with the sampling pulse C and the comparing and separating circuit 5 outputs binary signals E and F. That is, the signals E and F change from a state (0,0) to a state (1,0) and this state remains unchanged for four time slots. Since both of the signals E and F in the time slot T1 are 0, the outputs from the AND, inhibit, and OR circuits of the order selecting circuit 6 are 0 and thus the output G is 0. Since the signal E changes to 1 in the time slot T2, the output of the inhibit circuit I1 is 1, and since the output G in the time slot immediate before the time slot T2, that is, the output Gi/2−0.5 from the latch circuit 64 is 0, the outputs of the inhibit circuit I2 and the OR circuit O2 change to 1. When the writing sample pulse A is 1, that is, in the first half of this time slot, the output of the inhibit circuit I3 changes to 0, the output Gi/2 changes to 0, and the outputs from the inhibit circuit I3 and the OR circuit O3 (Gi/2+0.5) change to 1. Although the outputs E and F remain unchanged in the next timing slot T3, since the signal Gi/2−0.5 is 1, the outputs of the AND circuit 2 and the OR circuit O1 change to 1, the output G in the first half of the time slot changes to 1, and the output G in the second half of the time slot changes to 0. In the same manner, 1 and 0 signals are alternatively obtained in every time slot for portion 113 while a 1 signal is obtained continuously for the black portion 114 as indicated by (G) of FIG. 4.

It is apparent from the foregoing that the method of the present invention can convert a halftone image, besides black and white images, into electric signals with high fidelity without increasing the diode arrangement period of the photoelectric converting array 3 to double the maximum image frequency. In addition, in the case where the black portion of the image information is projected on about half of one photodiode element, a 1 output is obtained only in one half of the time slot so that a signal having a frequency double the maximum image frequency is obtained.

The invention is not limited to any of the embodiments described above, but all changes and modifications thereof not constituting departures from the spirit and scope of the invention are intended to be covered by the following claims.

What is claimed is:

1. The method of producing two serial binary output bits from the output voltage of each of an array of photoelectric converting elements comprising the steps of:
    comparing each element voltage output to two reference voltage levels, and
    using the results of said comparing step and the previous output bit to produce two serial output bits, (a) the two bits being both 1's or both 0's if the element output voltage is above the higher reference, or below the lower reference, respectively, or (b) the two bits being a 1 and a 0, or a 0 and a 1, if the element output voltage is between the reference levels, and the last previously produced output bit was a 1 or a 0, respectively.

2. The method of doubling the number of output bits from an array of photoelectric converting elements comprising the steps of comparing each element voltage to two reference levels and producing the following binary values of Ei and Fi, therefrom,
    (a) Ei=Fi=0 if the element output voltage is below both reference levels,
    (b) Ei=Fi=1 if the element output voltage is above both reference levels, and
    (c) Ei=1, Fi=0 if the element output voltage is between the reference levels, and generating two output image signals, Gi/2 and Gi2+0.5, according to the equation $$Gi/2 = Ei \cdot Fi + Gi/2 - 0.5 \cdot Ei \cdot \overline{Fi}$$

$$Gi/2 + 0.5 = Ei \cdot Fi + \overline{Gi/2 - 0.5 \cdot Ei \cdot \overline{Fi}}$$

where Gi/2 and Gi2+0.5 are two binary output signals, and Gi/2−0.5 is the previous binary output signal.

3. Apparatus for producing two serial binary bits of information from the voltage output of each element in an array of photoelectric elements comprising:
- means for generating two reference voltages,
- means for comparing said element output voltage to said reference voltages, and
- means for generating two serial bits for each element output voltage,
  - (a) the two bits being both 1's or both 0's if the element output voltage is above the higher reference, or below the lower reference, respectively,
  - (b) the two bits being a 1 and a 0, or a 0 and a 1, if the element output voltage was between the reference levels and the last previously produced bit was a 1 or a 0, respectively.

4. The apparatus of claim 3, said means for comparing comprising,
- two comparators, each for comparing a reference voltage to the instant array element output voltage and
- two latches for the temporary storage of the binary output of said comparators resulting from said comparison.

5. The apparatus of claim 3 wherein said means for generating comprises a digital circuit which is defined by the logic equations $$Gi/2 = Ei \cdot Fi + Gi/2 - 0.5 \cdot \overline{Ei \cdot Fi}$$

$$Gi/2 + 0.5 = Ei \cdot Fi + \overline{Gi/2 - 0.5 \cdot Ei \cdot Fi}$$

where $Ei = Fi = 0$ if the array element output voltage is below both reference voltage levels, $Ei = Fi = 1$ if the array element output voltage is above both reference voltages, $Ei = 1$ and $Fi = 0$ if the array element output voltage is between the reference voltage levels, $Gi/2$ and $Gi/2 + 0.5$ are the two binary output bits, and $Gi/2 - 0.5$ is the previous binary output bit.

* * * * *